United States Patent [19]

Gafford et al.

[11] Patent Number: 4,485,939
[45] Date of Patent: Dec. 4, 1984

[54] PLANTER SEED HOPPER WITH OPTIONAL CHEMICAL COMPARTMENTS

[75] Inventors: Alexander T. Gafford; David L. Murray, both of LaPorte, Ind.

[73] Assignee: Allis-Chalmers Corp., Milwaukee, Wis.

[21] Appl. No.: 426,984

[22] Filed: Sep. 29, 1982

[51] Int. Cl.³ .............................................. A01C 7/06
[52] U.S. Cl. ..................................... 222/129; 222/609; 111/73; 239/663
[58] Field of Search ............... 222/148, 151, 154, 129, 222/460, 462, 608, 609, 610, 164; 239/110, 656, 663; 111/73, 76, 80

[56] References Cited

U.S. PATENT DOCUMENTS

| | | | |
|---|---|---|---|
| 482,783 | 9/1892 | Bush | 111/83 |
| 514,071 | 2/1894 | Harrington et al. | 111/73 |
| 1,093,321 | 4/1914 | Ellis | 111/73 |
| 1,191,148 | 7/1916 | Braaten | 138/92 |
| 1,197,292 | 9/1916 | Hunter | 111/73 X |
| 1,567,536 | 12/1925 | Miller | 222/609 X |
| 3,409,173 | 11/1968 | Evnarsson | 222/608 X |
| 3,432,064 | 3/1969 | Ten Pas et al. | 220/263 |
| 3,685,468 | 8/1972 | Paige et al. | 111/73 X |
| 3,915,343 | 10/1975 | Barcock | 222/129 |
| 3,924,783 | 12/1975 | Ward | 222/134 |
| 4,263,858 | 4/1981 | Dreyer | 111/80 X |

FOREIGN PATENT DOCUMENTS 753514 2/1967 Canada ................. 222/608

Primary Examiner—Joseph J. Rolla
Assistant Examiner—Frederick R. Handren
Attorney, Agent, or Firm—Charles L. Schwab

[57] ABSTRACT

An agricultural planter (12) is provided with a hopper (37 or 137) which is adapted to receive a transverse partition wall (71 or 171) for dividing seed and chemical compartments (72, 73 or 205, 207). The chemical compartment (73 or 207) can be further divided into cells (73, 76 or 174', 176') by a longitudinal partition wall (77 or 177) whereby seed and two chemicals, such as a herbicide and an insecticide, can be dispensed from a single hopper (37 or 137) during a planting operation.

11 Claims, 15 Drawing Figures

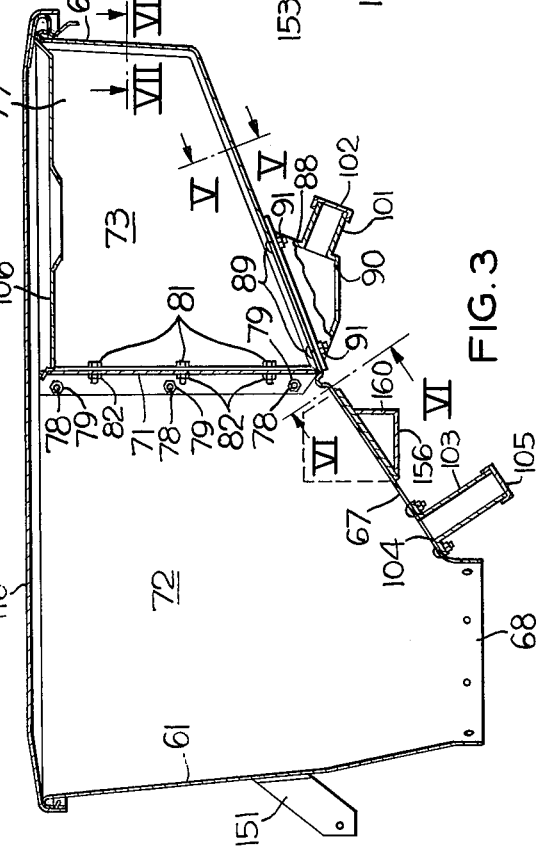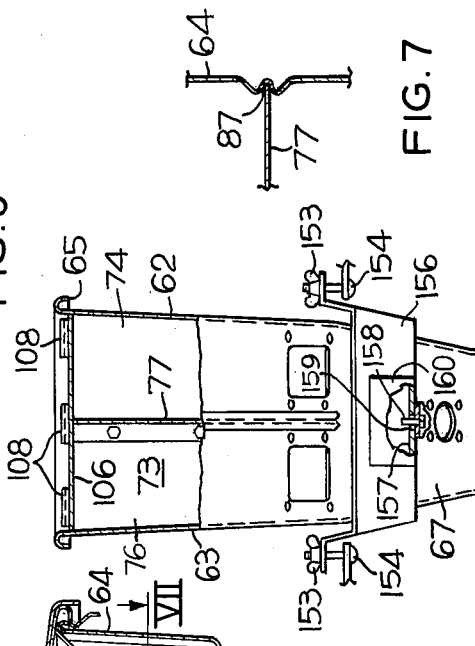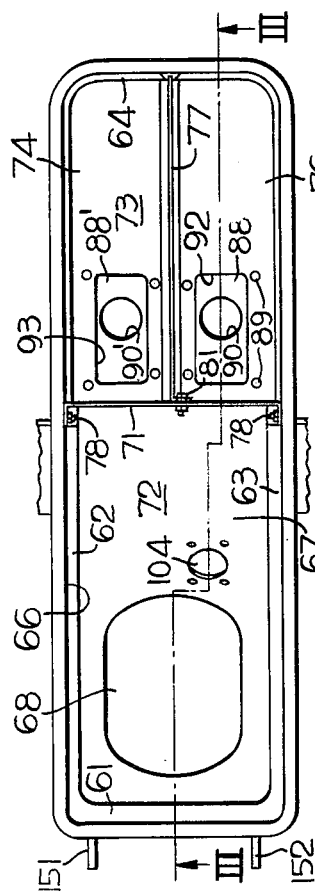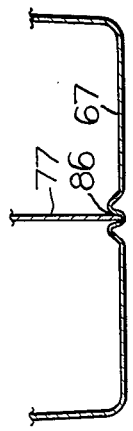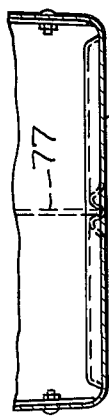

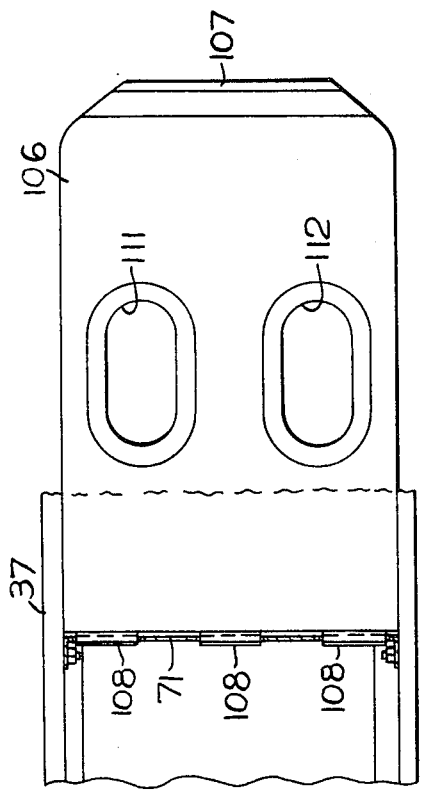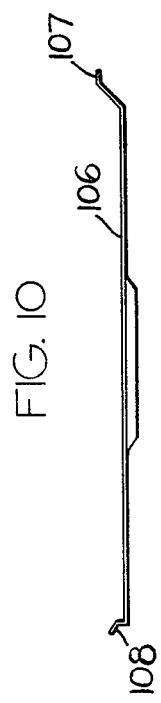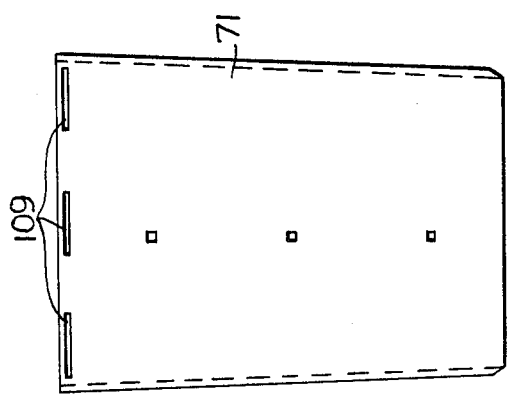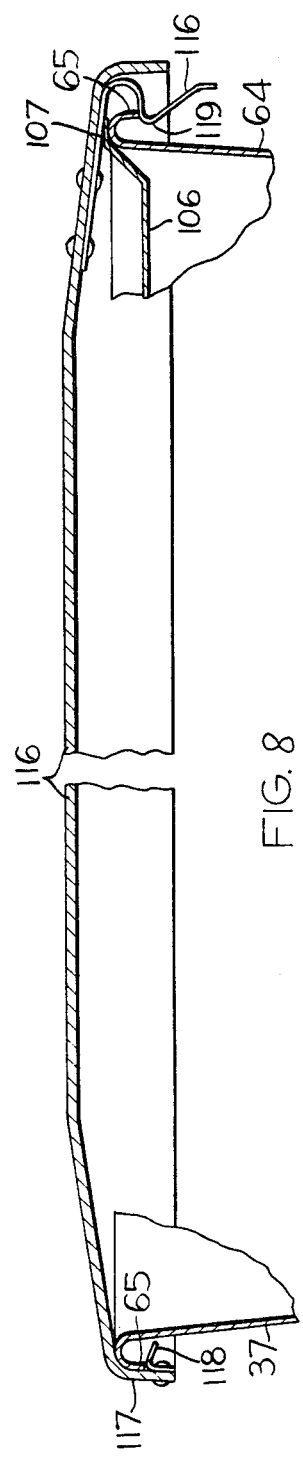

PLANTER SEED HOPPER WITH OPTIONAL CHEMICAL COMPARTMENTS

BACKGROUND OF THE INVENTION

1. Technical Field

This invention relates to an agricultural planter having a seed dispensing mechanism which receives seeds from a hopper which can be divided into seed and chemical compartments.

2. Prior Art

Heretofore others have provided hoppers for agricultural planters which are divided into seed and fertilizer compartments. Such constructions are shown in U.S. Pat. Nos. 1,093,321; 1,197,292; 3,432,064; 3,915,343 and 3,924,783. In U.S. Pat. No. 3,685,468, removable bins are provided on a lawn care vehicle which are arranged for simultaneous dispensing of a variety of chemicals onto a lawn.

SUMMARY OF THE INVENTION

This invention has particular utility in an agricultural planter of the type having a frame on which a seed dispensing mechanism is mounted. The hopper incorporating the present invention includes upstanding front, rear and side walls whose upper edges define a vertically open upper end permitting filling of the hopper. The hopper further includes a bottom wall connected to the side and rear walls which inclines downwardly from the rear wall to a vertically open seed dispensing opening adjacent the front wall directly above and in feeding relation to the dispensing mechanism. The side and bottom walls are adapted to receive a transverse partition wall dividing the hopper into front and rear compartments. Wall means are provided in the bottom wall which define at least one outlet for dispensing the contents of the rear compartment when the transverse partition wall is installed. The bottom may be adapted to receive a cover plate for closing the outlet. The bottom wall has sufficient rear to front downward incline to induce gravitational flow of seed from the rear compartment to the seed dispensing opening when the partition wall is not installed. The rear compartment may be further divided into two side-by-side cells by an upright longitudinal partition wall in which case outlets are provided in the bottom wall for each of the cells to facilitate dispensing of chemicals during the planting operation. A cover for the rear compartment may be hinged to the upper part of the transverse partition wall for movement between a substantially horizontal closed position and an upwardly disposed open position. Openings may be provided in the cover to facilitate filling of the rear compartment cells with the cover in its closed position. Additionally, a removable lid may be provided for the hopper for the purpose of covering its vertically open upper end to protect and contain the contents.

BRIEF DESCRIPTION OF THE DRAWINGS

The invention is illustrated in the drawings in which:

FIG. 2 is a top view of the hopper for the planting unit shown in FIG. 1 with parts removed for illustration purposes;

FIG. 3 is a view taken along the line III—III in FIG. 2 but with a lid and cover installed;

FIG. 4 is a rear view of the hopper shown in FIG. 3 with parts removed and broken away for illustration purposes;

FIG. 5 is a view taken along line V—V in FIG. 3;

FIG 6 is a view taken along the line VI—VI in FIG. 3;

FIG. 7 is a view taken along the line VII—VII in FIG. 3;

FIG. 8 is an enlarged vertical section showing the mounting of the lid on the hopper;

Fig. 9 is a rear view of the transverse partition wall;

FIG. 10 is a top view of a cover for the rear compartment of the hopper;

FIG. 11 is a side view of the cover shown in FIG. 10;

DETAILED DESCRIPTION OF THE DRAWINGS

Figure 1:
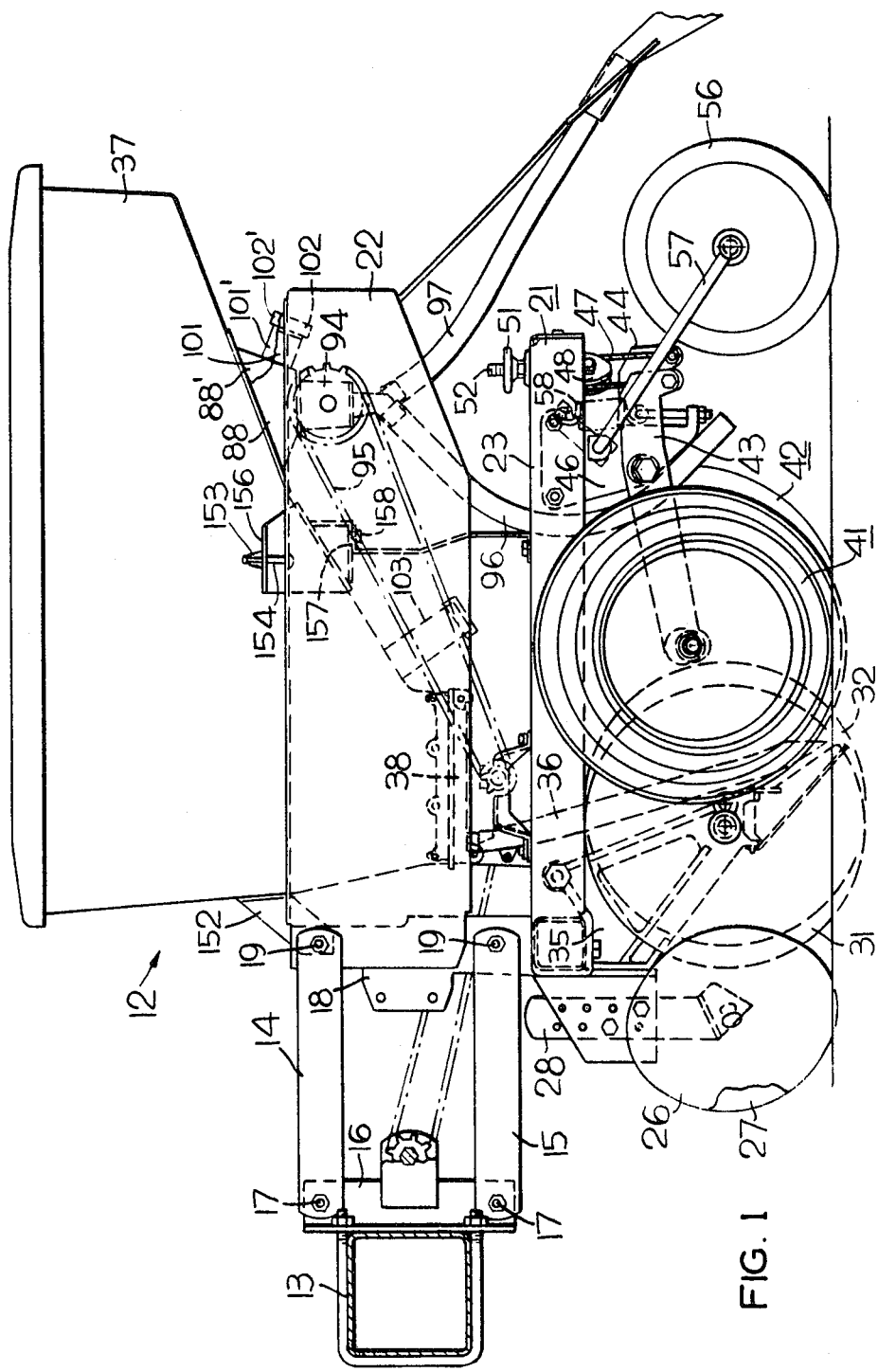
FIG. 1 is a side view of a planter unit.
Figure 12:
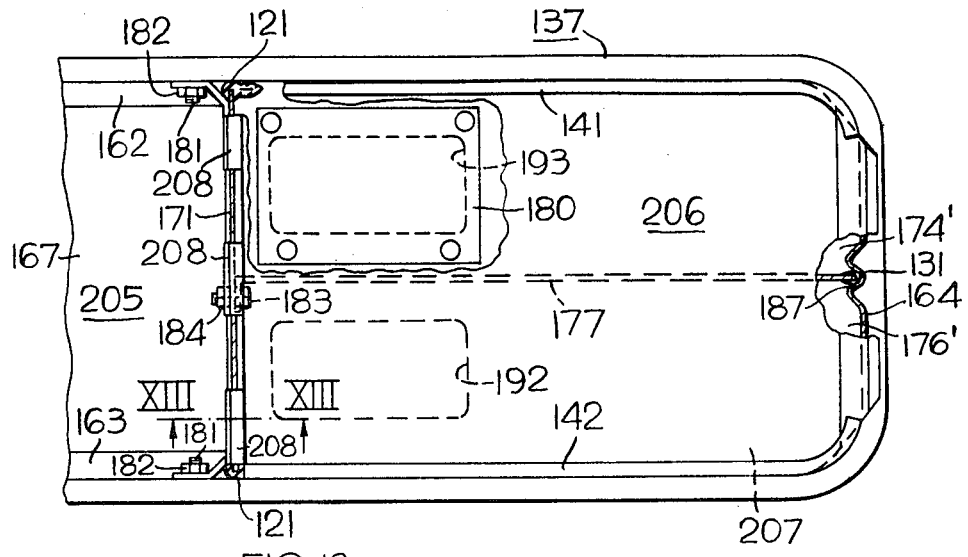
FIG. 12 is a partial top view of a planter hopper incorporating a second version of the present invention.
Figure 13:
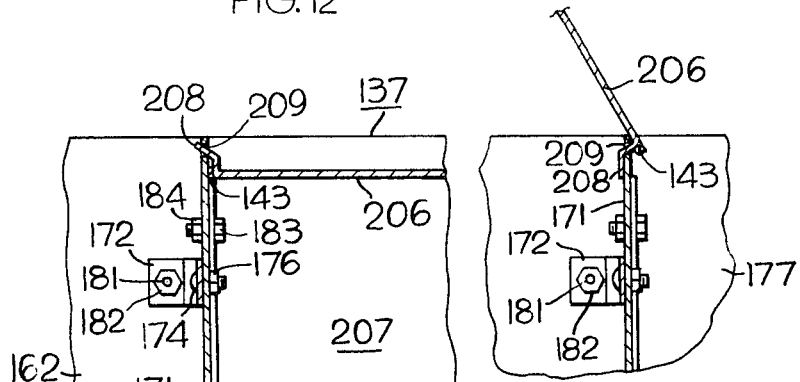
FIG. 13 is a view taken along the line XIII—XIII in FIG. 12.
Figure 14:
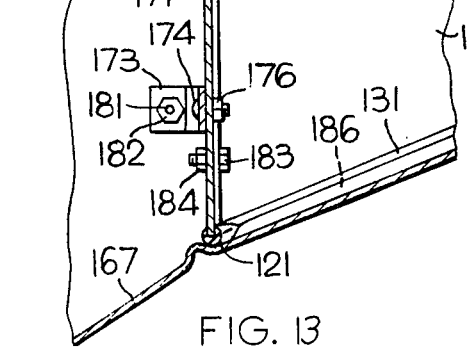
FIG. 14 is a view similar to FIG. 13 but showing the cover for the rear compartment pivoted to an upright open position.

Referring to FIG. 1, a planter unit 12 is connected to a draft appliance in a form of a tool bar 13 by a pair of parallel links 14 and 15. The forward ends of the links 14, 15 are pivotally connected on parallel transverse horizontal axes to a tool bar bracket 16 by pivot bolts 17, and the rear ends of the links 14, 15 are pivotally connected to a mast portion 18 of a planter unit frame 21 by a pair of parallel transverse pivot bolts 19. The tool bar 13 may be connected to a tractor hitch or may be towed by a tractor in which event vertically adjustable wheels (not shown) would be mounted on the tool bar for raising and lowering the latter. Appropriate stops or lift abutments, not shown, are provided to cause lifting of the planter unit 12 upon predetermined raising of the tool bar 13. The planter unit frame 21 includes an upper subframe 22 and lower subframe 23 with the mast portion 18 interconnecting the subframes.

A pair of forwardly converging trash clearing disks 26, 27 are rotatably mounted on a vertically adjustable disk support 28 in a lead position at the front of the frame 21. Seed trench forming means in the form of a pair of disk openers 31, 32, which are staggered in the fore and aft direction, are rotatably mounted on a support 35 rigidly secured to the frame 21. A seed tube 36 deposits seed in the trench formed by the disk openers 31, 32 as seed is delivered to the tube by a seed dispensing mechanism 38 positioned at the bottom of the seed hopper 37. A pair of combined gauge wheel and slicing disk assemblies 41, 42 are mounted on walking beams 43, 44 which are centrally pivoted to a bracket 46 on the subframe 23. The rear ends of the walking beams 43, 44 are interconnected by a cable 47 reeved about a pulley 48 to form an equalizing mechanism. The vertical position of the pulley 48 is adjusted by a hand wheel nut 51 threaded onto the threaded end of a yoke 52 on which the pulley 48 is rotatably mounted. Turning the hand wheel 51 adjusts the depth of planting. A trench firming press wheel 56 is rotatably mounted on a wheel support lever 57 which is resiliently biased by a tension spring 58.

The hopper 37, shown in FIGS. 1 through 11, includes a front wall 61, a pair of side walls 62, 63 and a rear wall 64 whose upper edges are curved outwardly and downwardly to present a rolled over lip or rim 65 defining a vertically open upper end or opening 66 permitting the hopper to be filled with seed and chemicals. The front wall 61, side walls 62, 63 and a bottom wall 67 form a vertical discharge opening 68 adjacent the front wall 61 directly above the seed singulating and dispensing mechanism 38. The hopper 37 is adapted to receive a transverse partition wall 71 which subdivides or partitions the hopper into a front seed compartment 72 and a rear chemical compartment 73. The rear chemical compartment may be further subdivided into a pair of side-by-side cells 74, 76, suitable for receiving two different chemicals such as an insecticide and a herbicide, by an upright longitudinal partition wall 77 extending between the rear wall 64 and the transverse partition wall 71. The transverse partition wall 71 is releasably secured to the side walls 62, 63 by releasable fastening means in the form of bolts 78 passing through aligned openings in flange portions of the transverse partition wall 71 and in the side walls 62, 63 and by nuts 79 threaded into bolts 78. The longitudinal partition wall 77 is releasably secured to the transverse partition wall 71 by releasable fastening means in the form of bolts 81 passing through aligned openings in a flange on the front end of the longitudinal partition wall 77 and in the transverse partition wall 71 and by nuts 82 threaded onto bolts 81. As shown in FIG. 5, the bottom of the partition wall 77 fits in a recess 86 in the bottom wall 67 and, as shown in FIG. 7, the rear of the partition wall 77 fits in a recess 87 in the rear wall 64. A pair of chutes 88, 88' are bolted to the bottom wall 67 by bolts 89 and nuts 91 for receiving chemicals discharged from the cells 74, 76 through openings or outlets 92, 93 in the bottom wall 67. The chutes 88 have discharge openings 90, 90' and clean-out openings in the form of spouts 101, 101' to which internally threaded caps 102, 102' are screwed. The seed compartment 72 has a clean-out opening in the form of a spout 103 bolted at its upper end to the underside of the hopper bottom 67 in registration with an opening 104 in the seed bottom 67. A cap 105 is threaded onto a threaded lower end of the spout 103. As shown in FIG. 1, a metering device 94 is secured to the bottom of each of the chutes 88, 88' and upon being driven through endless chain 95 delivers chemicals from the cells 74, 76 to a pair of discharge tubes 96, 97.

A cover 106 is provided for the cells 74, 76 of the rear compartment 73 which lies horizontally in its closed position, as shown in FIGS. 3, 4, 8 and 10. A rear flange 107 of the cover 106 rests on the top of the lip 65 of the rear wall 64 and three upwardly and forwardly extending tabs 108 extend through three slots 109 in the upper portion of the transverse partition wall 71 to form a releasable hinge connection. The cover 106 has a pair of filling holes 111, 112 which permit filling the cells 74, 76 with the cover in its closed position. Filling the cells through the openings 111, 112 is believed to reduce chemical dust, prevent loss of chemicals when filling in a strong wind and substantially avoids intermixing of the chemicals with which the cells 74, 76 are filled.

A lid 116 is provided for the upper opening of the hopper 37 which has a rim 117 extending downwardly in inward confronting relation to the lip 65 of the hopper 37. A finger 118 riveted to the front of the lid 116 hooks under the front of the hopper lip 65 and a toe 119 of a resilient latch 116 riveted to the rear of the lid 116 hooks under the hopper lip 65 at the rear of the hopper 37 to releasably retain the lid 116 on the hopper.

As shown in FIG. 8, the flange 107 of the cover 106 is sandwiched between the lid 116 and the lip 65 of the rear wall 64.

In the embodiment of the invention shown in FIGS. 12–15, a sealing strip 121 is installed on the lateral and bottom edges of a transverse partition wall 171 and, as illustrated, the edge sealing strip 121 is in sealing engagement with side walls 162, 163 and a bottom wall 167 of the hopper 137. The transverse wall 171, which divides the hopper 137 into front and rear compartments 205, 207, is releasably secured to a pair of transverse brackets 172, 173 by bolts 174 and nuts 176. The vertically spaced transverse brackets 172, 173 are releasably secured to the side walls 162, 163 by bolts 181 and nuts 182. An upright longitudinal partition wall 177, dividing the rear compartment 207 into cells 174', 176', is releasably secured to the transverse partition wall 171 by bolts 183 and nuts 184. A sealing strip 131 is fastened to the rear and bottom edges of the longitudinal partition wall 177 and is in sealing engagement with the interior surfaces of the rear and bottom walls 164, 167 defining grooves 187, 186. A cover 206 for the rear compartment 207 of the hopper 137 is hinged on the top of the transverse partition wall 171 by three tabs 208 in loose fitting relation to three transverse slots 209 in the upper portion of the transverse partition wall 171. A sealing strip 143 is bonded or glued to a front edge of the cover 206 and edge sealing strips 141, 142 installed on the laterally opposite edges of the cover 206 complete the sealing of the cover.

Figure 15:
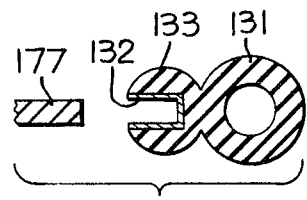
FIG. 15 is an exploded view of a partition wall and a sealing structure.

In FIG. 15, the sealing strip 131 is shown exploded from the rear edge of wall 177 to better show one of the small metal clips 132 molded into the strips 121, 131, 141, 142 along their length and, when pushed onto the edges of the walls 171, 177 and cover 206, serve to grip and hold the sealing strips 121, 131, 141, 142 thereto. The clips 132 are molded into the resilient, rubber-like portion 133 of the sealing strip 131 which is preferably resistant to the chemicals used in agricultural planting operations.

OPERATION

When it is desired to plant without using chemicals such as herbicide or insecticide the partition walls 71 and 77 (or walls 171 and 177) can be removed, along with the cover 106 (or cover 206), so as to permit the entire hopper capacity to be used to store seed for planting. In that event, cover plates would normally be placed over the openings 92, 93 in the bottom wall 67. One such cover plate 180 is shown installed over outlet 193 in FIG. 12. The bottom walls 67 and 167 slope downwardly from the rear walls 64 and 164 at a sufficiently steep incline to insure gravitational flow of the seed to the vertical discharge opening in the lower front of the hopper.

When it is desired to dispense a chemical such as an insecticide or a herbicide at the time of planting, the transverse partition wall 71 (or wall 171) can be installed in the hopper 37 (or hopper 137) together with the cover 106 (or cover 206), thereby dividing the hopper 37 (or hopper 137) into a front compartment for seed and a rear compartment for the chemical. The cover plate would be removed from one of the outlets 92, 93 (or outlets 192, 193)

If it is desired to dispense two chemicals such as a herbicide and an insecticide during planting, both the partition walls 71 and 77 (or walls 171 and 177) are installed in the hopper and the cover plates are removed from the outlets 92, 93 (or outlets 192, 193) of the cells of the rear compartment. It is, of course, possible to discharge a single chemical by simply not filling one of the cells.

In filling the cells 74, 76 of the hopper 37, the cover 106 may be left in a closed position and the cells filled through the openings 111 and 112 in the cover. This construction and method of filling the cells is believed to minimize chemical dust and attendant loss of chemicals. In filling the cells of the rear compartment 207 of hopper 137, the cover 206 is raised from its horizontal closed position, shown in FIGS. 12 and 13, to its open position, shown in FIG. 14, in which the tabs 208 abut the front side of the wall 171 below the slots 209. In this position the center of gravity of the cover is forward of the hinge joint and thus the cover will remain in its open position once moved thereto.

The pivot connection between forward extending brackets 151, 152 on the hopper 37 and the mast portion 18 of the planter frame 21 permits the hopper 37 to be raised to facilitate changing singulation plates of the dispensing mechanism 38 or servicing of the latter. Before the hopper can be raised, wing nuts 153 are removed from bolts 154 extending upwardly from the upper frame section 22 so as to permit an abutment seat 156 secured to the underside of the bottom wall of the hopper to be raised from a complementary seat 157 on the frame 21 with which it is in thrust transmitting engagement. A pilot pin 158 on the upper end of the support 157 fits loosely in an opening 159 in the horizontal leg of an angle portion 160 of the abutment seat 156 and thus it does not prevent upward swinging movement of the hopper.

The embodiments of the invention in which an exclusive property or privilege is claimed are defined as follows:

1. In an agricultural planter including a frame and a seed dispensing mechanism mounted on the frame, the combination comprising:
   a pivot part on said frame adapted for connection to a draft appliance on a transverse pivot axis,
   a hopper pivotally connected to said frame on said axis for vertical swinging movement between raised and lowered positions, said hopper having upstanding front, rear and side walls whose upper edges define a vertically open upper end permitting filling of the hopper and a bottom wall connected to said side and rear walls and sloping downwardly from the rear wall to a vertically open seed dispensing opening adjacent the front wall directly above and in feeding relation to said dispensing mechanism,
   said side and bottom walls being adapted to receive a transverse partition wall dividing said hopper into front and rear compartments,
   wall means in said bottom wall defining at least one outlet for dispensing the contents of said rear compartment when said transverse partition wall is installed, and
   said bottom wall having a sufficient rear to front downward incline to induce gravitational flow of seed from said rear compartment to said seed dispensing opening when said transverse partition wall is not installed.

2. The planter of claim 1 and further comprising a cover for said rear compartment hinged to the upper part of said transverse partition wall for movement between a substantially horizontal closed position and an open position.

3. The planter of claim 2 wherein said cover includes wall means defining a vertical opening facilitating filling said rear compartment when said cover is in its closed position.

4. The planter of claim 3 and further comprising a removable lid for said hopper covering said vertically open upper end.

5. The planter of claim 1 wherein said bottom wall is adapted to receive a cover plate closing said outlet when said transverse partition wall is not installed.

6. The planter of claim 1 and further comprising clean-out openings in said bottom wall for substantially emptying said front and rear compartments without removal of said hopper from said frame.

7. The planter of claim 1 wherein said hopper includes a downwardly facing abutment seat on the underside of said bottom wall and a complementary seat on said frame in thrust transmitting relation with said abutment seat when said hopper is in its lowered position.

8. The planter of claim 9 and further comprising releasable fastening means securing said hopper to said frame whereby said hopper is selectively maintained in its lowered position.

9. The planter of claim 1 wherein said bottom and rear walls are adapted to receive an upright longitudinal partition wall extending between said rear wall and said transverse partition wall for dividing the rear compartment into two side-by-side cells.

10. The planter of claim 9 including wall means in said bottom wall defining an outlet for each of said cells for dispensing the contents therefrom.

11. The planter of claim 10 and further comprising a dispensing mechanism for each of said cells operable to meter the contents of said cells to predetermined discharge points.

* * * * *

UNITED STATES PATENT OFFICE
CERTIFICATE OF CORRECTION

Patent No. 4,485,939             Dated December 4, 1984

Inventor(s) Alexander T. Gafford & David L. Murray

It is certified that error appears in the above-identified patent and that said Letters Patent are hereby corrected as shown below:

In the Abstract, line 6, "(73, 76 or 174', 176')" should read --- (74, 76 or 174', 176') ---;

Column 6, line 38, "claim 9" should read --- claim 7 ---.

Signed and Sealed this

Eleventh Day of June 1985

[SEAL]

Attest:

DONALD J. QUIGG

Attesting Officer       Acting Commissioner of Patents and Trademarks